R. J. KITTREDGE.
PHONOGRAPH.
APPLICATION FILED MAY 10, 1915.

1,368,264.

Patented Feb. 15, 1921.

Witnesses:

Inventor:
Rufus J. Kittredge
By Brown, Nissen & Sprinkle
Attys.

UNITED STATES PATENT OFFICE.

RUFUS J. KITTREDGE, OF CHICAGO, ILLINOIS.

PHONOGRAPH.

1,368,264.  Specification of Letters Patent.  Patented Feb. 15, 1921.

Application filed May 10, 1915. Serial No. 26,946.

*To all whom it may concern:*

Be it known that I, RUFUS J. KITTREDGE, a citizen of the United States, residing at Chicago, in the county of Cook and State of Illinois, have invented certain new and useful Improvements in Phonographs, of which the following is a specification.

My invention relates to phonographs and has for its main objects the provision of effective means for rendering a phonograph more convenient in the manipulation of the same incident to engaging the stylus of the tone-box with the starting end of the groove of the record and starting the machine, stopping the machine after the record is played, and resetting the machine to play.

Further objects relate to the provision of devices for effecting such convenient manipulation, which are well adapted for their purposes, and which are of themselves convenient in manipulation.

Other objects will appear hereinafter.

My invention is exemplified in the combinations and arrangement of parts hereinafter described, illustrated in the accompanying drawings forming a part of this specification, and more particularly defined in the subjoined claims.

I have shown my invention as embodied in a cabinet phonograph using disk records, but it is understood that it may be embodied in any other form of phonograph or talking machine, when so desired. The application of this invention will be apparent from the description hereinafter set forth.

Referring more particularly to the drawings, the cabinet 20 is provided with a compartment 21 adapted to hold records or any other articles desired, a compartment 22 in which the sound modifying apparatus is housed, and a compartment 23 in which the sound amplifying mechanism and motor are housed. At the top of the cabinet, is a lid or cover 24, hinged as at 25 to the cabinet. Slightly below the top of the cabinet and secured rigidly thereto, is a horizontal partition 26 upon which is mounted the sound-producing portions of the device.

To the under side of the partition 26 is secured a spring motor 27, which may be of any approved or desired design, which is provided with a standard 28 upon which is mounted a turn-table 29. The turn-table is adapted to support a record 30 of any conventional or desired construction. It will be apparent that a motor driven in any other manner than by a spring may be used to produce rotation of the shaft 28 when so desired, without departing from my invention.

Secured in a suitable opening in the partition 26, is a tube 31 having flanges 32 and 33 rigidly secured to the partition 26 by means of bolts 34 or their equivalent. The tube 31 is provided with an upstanding arm 35 and a tone arm 36 is pivoted in the tube 31 and by arm 35 for free oscillatory movement.

The tone arm is preferably tapering, as indicated in the several views, and is provided with a goose-neck 37 pivoted thereto as at 38. The goose-neck supports the sound box 39 which is provided with a needle 40 adapted to coöperate with the record 30 in the well-known manner to produce sound waves in the sound box by means of its contact with the turning record 30.

In order to render the phonograph easily and quickly started, I provide means which automatically engages the needle 40 with the record 30 and at the same time starts the motor 27. In the form shown, a rockshaft 41 has one end journaled in the cabinet, as at 42, and its other end journaled in a bearing member 43 carried on an irregularly shaped plate 44. The plate 44 is secured to the partition 26 by means of screws 45. The extended end of the rockshaft 41 is provided with a manually operable handle 46 by means of which the shaft is moved in one direction. Shaft 41 is intended to remain in one position when the phonograph is not in use. This position is indicated by a pointer 47 pointing toward a "stop" indication on a plate 48 secured to the outer side of the cabinet. In order to maintain the shaft and handle in such normal positions, I provide a torsion spring 49 which is secured to the shaft, at one end, and at the other end to the cabinet.

Pivoted on the plate 44, is a brake lever 50 carrying a brake member 51 at one end and having its other end adjacent the inner end of rock-shaft 41, and the latter is provided with an arm 52 engaging the brake lever 50 so that upon movement of the rockshaft the arm 52 will cause the brake 51 to be moved from engagement with the turntable 29. The brake 51 is normally held in contact with the turn-table by means of a coiled wire spring 53 which is coiled around the pivotal member 54 of the lever 50 and engages said lever and plate 44.

In order to maintain the brake 51 out of engagement with the turn-table, I provide a lock 55 which is pivoted to the plate 44, as at 56, and having a nose 57 adapted to engage an arm 58 on the shaft 41, so that when the shaft 41 and handle 46 are moved until pointer 47 registers with the indication "Start" on plate 48, the arm 58 will ride over the cam surface of the part 57 of lock 55, thereby holding the handle 46 and shaft 41 in their last-named positions to hold the brake 51 out of engagement with the turntable 29. From this arrangement then, it will be seen that in order to start the turntable, it is only necessary to move the lever 46 from its "stop" to its "start" position as indicated by pointer 47. The lock 55 is provided with a spring 59 which normally holds member 57 in engagement with arm 58. This will permit the turn-table to revolve until the lock 55 is disengaged from arm 58, and when this is done, spring 49 will automatically return the shaft 41 and parts connected therewith, to such positions to stop the turn-table 29.

Figure 3:
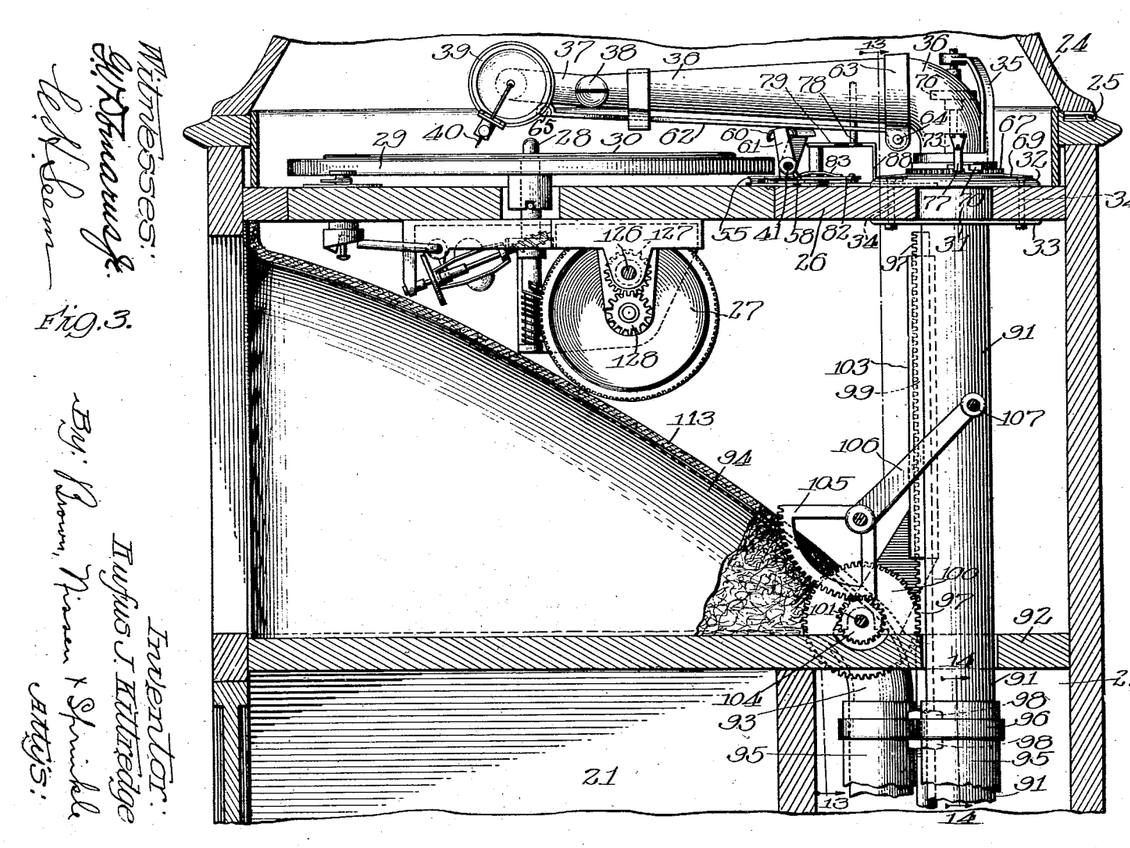
Fig. 3 is a section taken on line 3—3 of Fig. 2.
Figure 4:
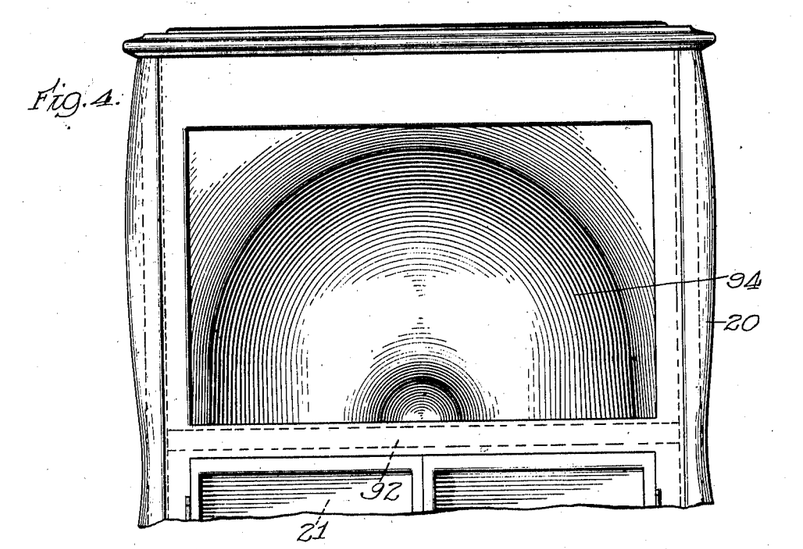
Fig. 4 is a fragmental front view of the cabinet showing the mouth of my improved amplifying member.
Figures 5, 6, 7:
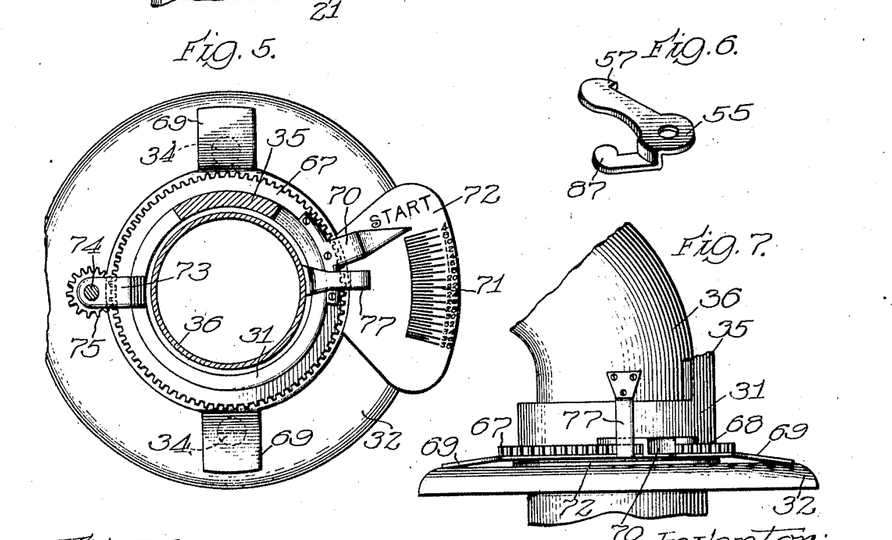
Fig. 5 is an enlarged section taken on line 5—5 of Fig. 13.
Fig. 6 is an enlarged perspective view of a locking member employed in the construction.
Fig. 7 is a side elevation of the portion shown in Fig. 5.
Figure 8:
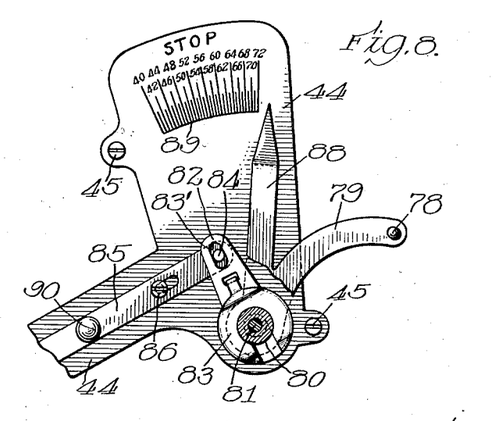
Fig. 8 is a section taken on line 8—8 of Fig. 9.
Figures 9, 10:
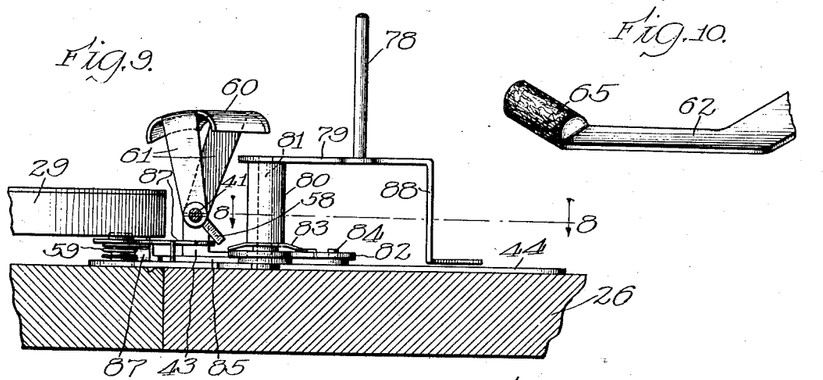
Fig. 9 is an enlarged detail section taken on line 9—9 of Fig. 2.
Fig. 10 is an end portion of a lever used to elevate the tone arm.
Figure 11:
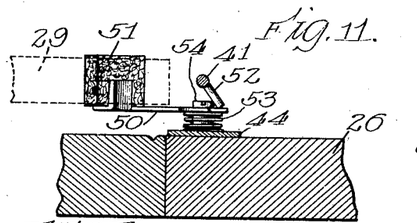
Fig. 11 is an enlarged section taken on line 11—11 in Fig. 2.
Figure 12:
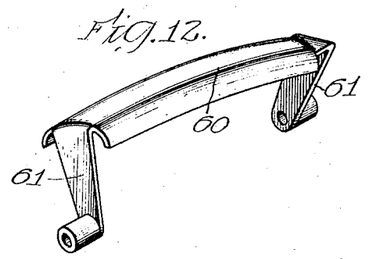
Fig. 12 is an enlarged perspective view of a cam member used to elevate the sound box.

In order to effect lowering and raising of the sound box and needle toward and away from the record, I provide means on the rock-shaft 41 for moving these parts as indicated. I preferably provide a cam 60 having its cam surface on an arc of a circle concentric with the pivotal axis of the tone arm 36, so that whatever position the tone arm is in, the cam 60 will operate to move the needle in substantially the same manner. The cam 60 is preferably provided with two foot members 61 which are rigidly secured to the rock-shaft 41, so that upon rotation of the rock-shaft the cam 60 will be oscillated. Coöperating with the cam 60 is an arm 62 which is pivoted to a clamp 63 as at 64. The other end of arm 62 is provided with a cushion 65 adapted to engage a suitable portion of the goose-neck 37 so that upon the cam 60 engaging the arm 62 the goose-neck 37 will be raised upwardly, thereby freeing the needle 40 from the record 30. The cam is so timed with shaft 41 that it is out of engagement with the arm 62 when handle 46 is in its position where pointer 47 points toward the indication "Start". When the handle 46 is moved until pointer 47 registers with the word "Stop" on plate 48, the cam 60 rides under arm 62 and raises the needle, sound box 39 and goose-neck 37 substantially to their positions shown in Fig. 3. The position of cam 60 shown in Fig. 3, is its position when the brake 51 is in engagement with the turntable 29 and lock 55 is out of engagement with the arm 58 and indicates the inoperative position of the phonograph.

It is found that all records do not have their sound grooves beginning at the same distance from their peripheral edges. Also that these sound grooves do not end at the same distance from the center of the records. I have therefore provided a simple and efficient means for easily and quickly setting the needle so that the phonograph will begin to play as soon as the turn-table has been started, and the needle lowered into contact with the record. I have also provided simple means whereby the stopping mechanism of the phonograph may be set so that the phonograph will be automatically stopped as soon as the ends of the sound grooves have been reached by the needle. In accomplishing this purpose, I preferably provide a label 66 on each record, bearing certain instructions which will facilitate operating the phonograph to get the best results from the records. On this label I preferably indicate the most desirable kind of needle which will best play the record. Next, I have indicated the proper speed at which the record will give the best results. Also, I have indicated stopping and starting positions at which the stopping and starting mechanism, described later, may be set in order to cause the phonograph to be started and stopped at the beginning and end of the sound groove of the record. The last notation on the label indicates a point on the scale of the tone modifying mechanism, described later, at which the indicator may be set in order to produce the most pleasing result.

Figure 2:
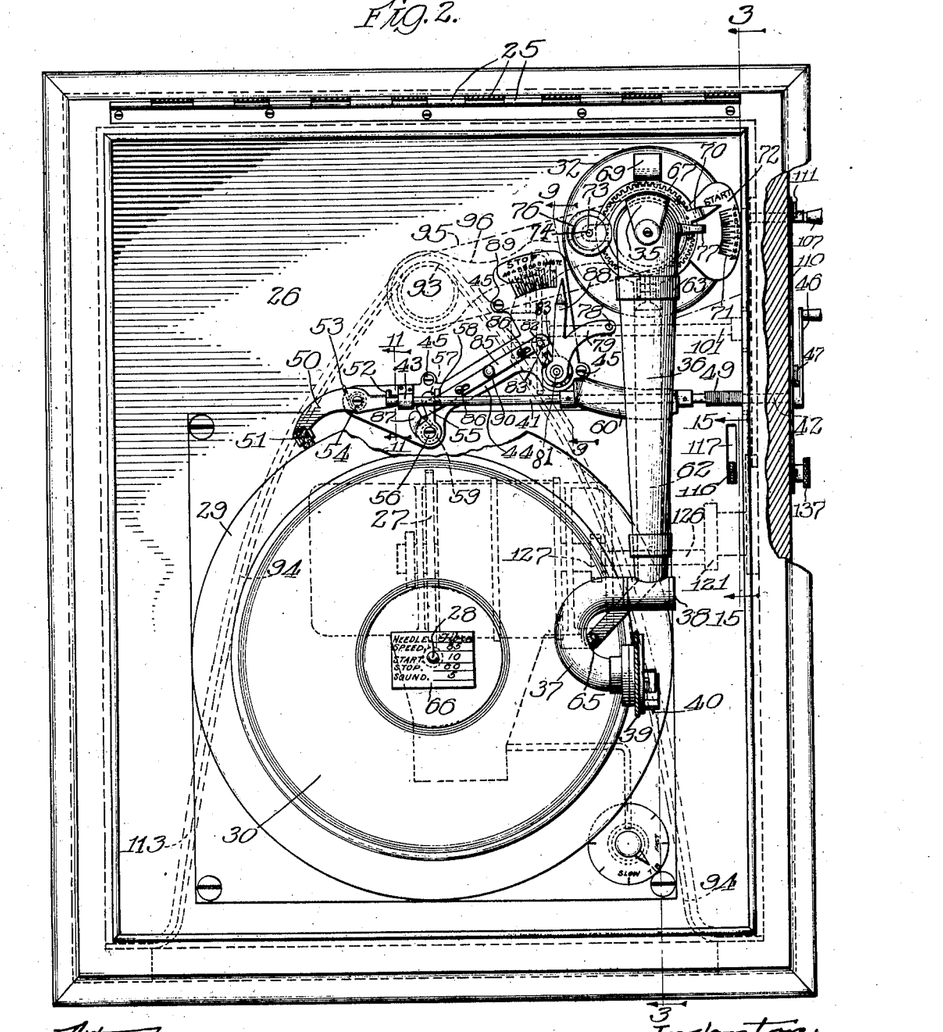
Fig. 2 is a top view of the same with the cover removed and indicated as looking from line 2—2 of Fig. 1.

I have shown a convenient starting means which comprises an annular member 67, having gear teeth thereon, rotatably mounted on the upwardly extending portion of tube 31. The tube 31 is provided with a shoulder 68 against which the annular member 67 is held by a sheet metal spring 69. The spring 69 is provided to prevent the annular member 67 from being too easily rotated. On the annular member I secure a pointer 70 adapted to coöperate with graduations 71 on a plate 72 carried on the flange 32. On the shoulder 68 is an arm 73 in which is journaled shaft 74 carrying a pinion 75 meshing with the teeth of the annular member 67. The shaft 74 is provided with a hand wheel 76 by means of which the annular member 67 is rotated to bring its pointer 70 in registration with a desired indication on the scale 71. On the tone arm is provided a finger 77 adapted to coöperate with the pointer 70 to stop the tone arm at the proper position to permit the needle 40 to engage the record at the beginning of the sound groove therein. Thus, if a record, such as indicated in Fig. 2, bears the starting notation "10" the hand wheel 76 should be rotated until pointer 70 points to the indication "10" on scale 71. Then, upon moving the tone arm until finger 77 engages the pointer 70, the needle will be in proper position to engage the record at the beginning of the sound groove in the latter.

In order to automatically stop the machine at a desired position, I provide an automatic stop consisting of a trip member 78 mounted on an arm 79 and the latter carried on a sleeve 80 mounted on an upright post 81. The sleeve 80 is connected to an arm 82 by means of a sheet metal spring 83, so that the arm 82 may be adjusted relatively to the arm 79. The arm 82 is provided with a slot 83' which engages a pin 84 carried by a longitudinally movable bar 85. Said bar is mounted by means of screws 86 passing through slots in the bar and threaded into plate 44, so that oscillatory movement of arm 82 will cause reciprocatory movement of the bar 85. The lock 55 is provided with an arm 87 engaging the end of bar 85, so that when the tone arm 36 engages the member 78 further movement of the tone arm causes movement of arms 79 and 82, thereby moving bar 85 against arm 87 to disengage member 57 of lock 55 from the arm 58, permitting the spring 49 to move rock-shaft 41, thereby moving cam 60 to raise the needle from the record and permit spring 53 to return the brake 51 to engagement with the turn-table 29 to stop the device. In order to vary the stopping point, or the point at which the tone arm will engage member 78, I provide a pointer 88 on arm 79 adapted to coöperate with graduations 89 on plate 44. The graduations are such that upon noting the stop instructions on label 66 and moving the pointer 88 until it registers with the graduation 89 corresponding to the instruction on label 66, the phonograph will be automatically stopped as soon as the tone arm engages lever 78. This position will be the position at which the sound groove stops on the record 30. The bar 85 is provided with a manually operable handle 90 by means of which the lock 55 may be disengaged from the arm 58 to stop the machine at any desired time and before the tone arm engages member 78.

By changing the length of the sound wave conducting tube or parts of the phonograph, I am enabled to vary the pitch and quality of the tone of the instrument. I preferably accomplish this by providing a tube 91 which is rigidly secured in and depends from the tube 31. The tube 91 preferably extends through a partition 92 separating chambers 23 and 22. The tube 91 is in open communication with the larger end of the tone arm 36. Parallel with the tube 91 and situated in compartment 22, is a tube 93 which extends through partition 92 and is connected with the sound amplifying member 94. On the portions of tubes 91 and 93 which extend through the partition 92, is slidably mounted a U-shaped tube 95 adapted to be moved longitudinally of the tubes 91 and 93 to vary the total effective length of said tubes. The movement of tube 95 may be accomplished in any desired manner, but I prefer to provide two yokes 96 and connect a rod 97 thereto by means of nuts 98. The rod 97 is extended through the partition 92 and provided with rack teeth 99 engaging a gear 100 carried on a shaft 101. The shaft 101 is journaled in a bearing 102 which is provided with an upstanding portion 103, forming a bearing for the rod 97. Also secured to shaft 101 is a pinion 104 meshing with a segmental gear 105. Formed on the segmental gear 105 is an arm 106 having a handle portion 107 extending through a slot 108 in the casing 20. On the outer side of the casing is a plate 109 having graduations 110 thereon which coöperate with a pointer 111 carried by handle 107. The graduations 110 are adapted to correspond with the last instruction on label 66 of the record, so that upon setting the pointer 111 corresponding with the number of the last instruction on label 66, the sound wave conducting tube will be lengthened to the desired length to produce the desired effect from the record.

Figures 13, 14:
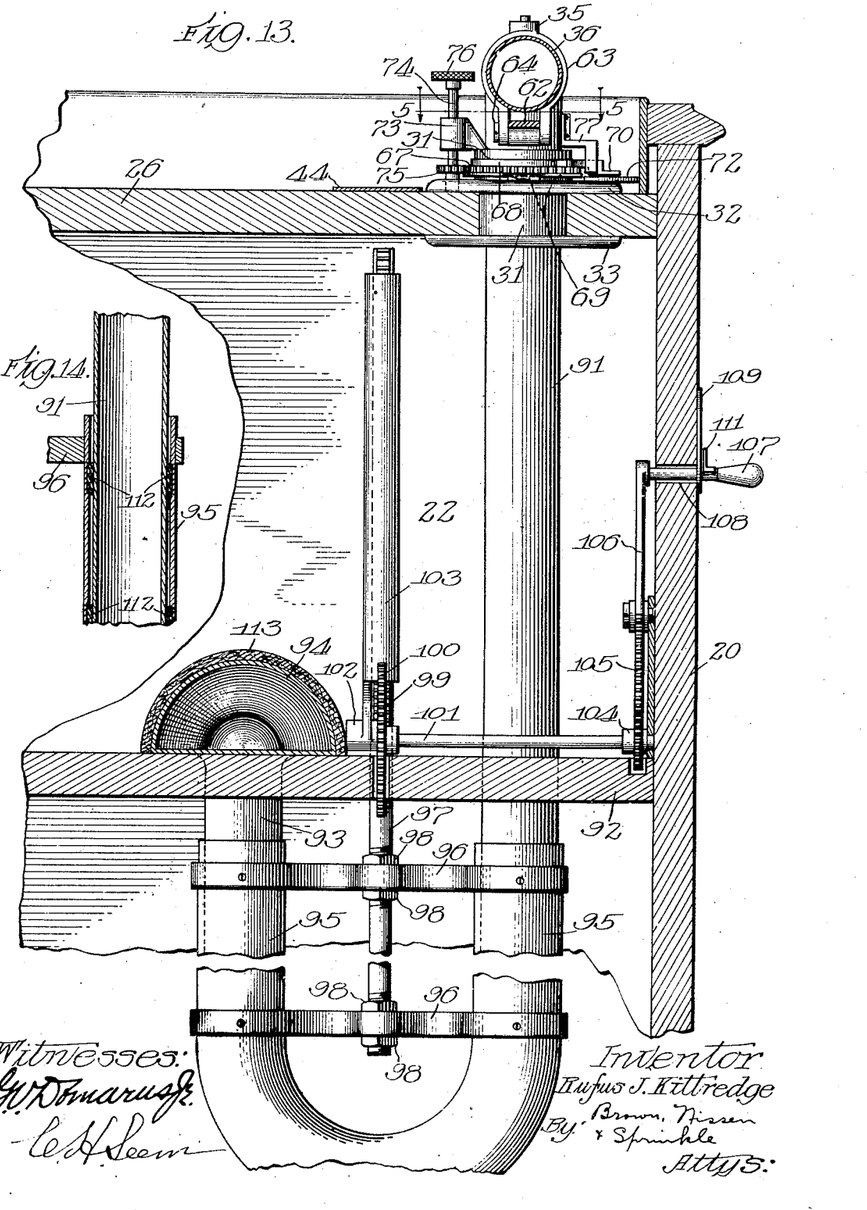
Fig. 13 is an enlarged section taken on line 13—13 in Fig. 3.
Fig. 14 is an enlarged fragmental section taken on line 14—14 in Fig. 3.

In order to form tight connections between the tubes 91, 93 and 95, I preferably provide, as shown in Fig. 14, soft members 112 of felt or some other suitable substance. The soft members 112 also prevent the sound waves from vibrating the tubes, thereby producing interfering noises which might be transmitted to the sound amplifying member. The members 112 may be secured to one or the other of the tubes by means of any suitable adhesive or in any other desired manner.

The sound amplifying member 94 is substantially semi-circular in cross section and gradually flaring from its inner end to its outer end. The bottom side of the member is substantially horizontally disposed on the partition 92. The outer sides of the walls of the sound amplifying member 94 are preferably covered with a covering 113 of felt, rubber composition, or other suitable substance to prevent transmitting sound from the chamber 23 to the sound amplifying member and to prevent loss of the sound waves through the walls of the member 94. The covering 113 may be secured to the member 94 in any desirable manner, such as by a suitable adhesive.

Figures 15, 16, 17, 18:
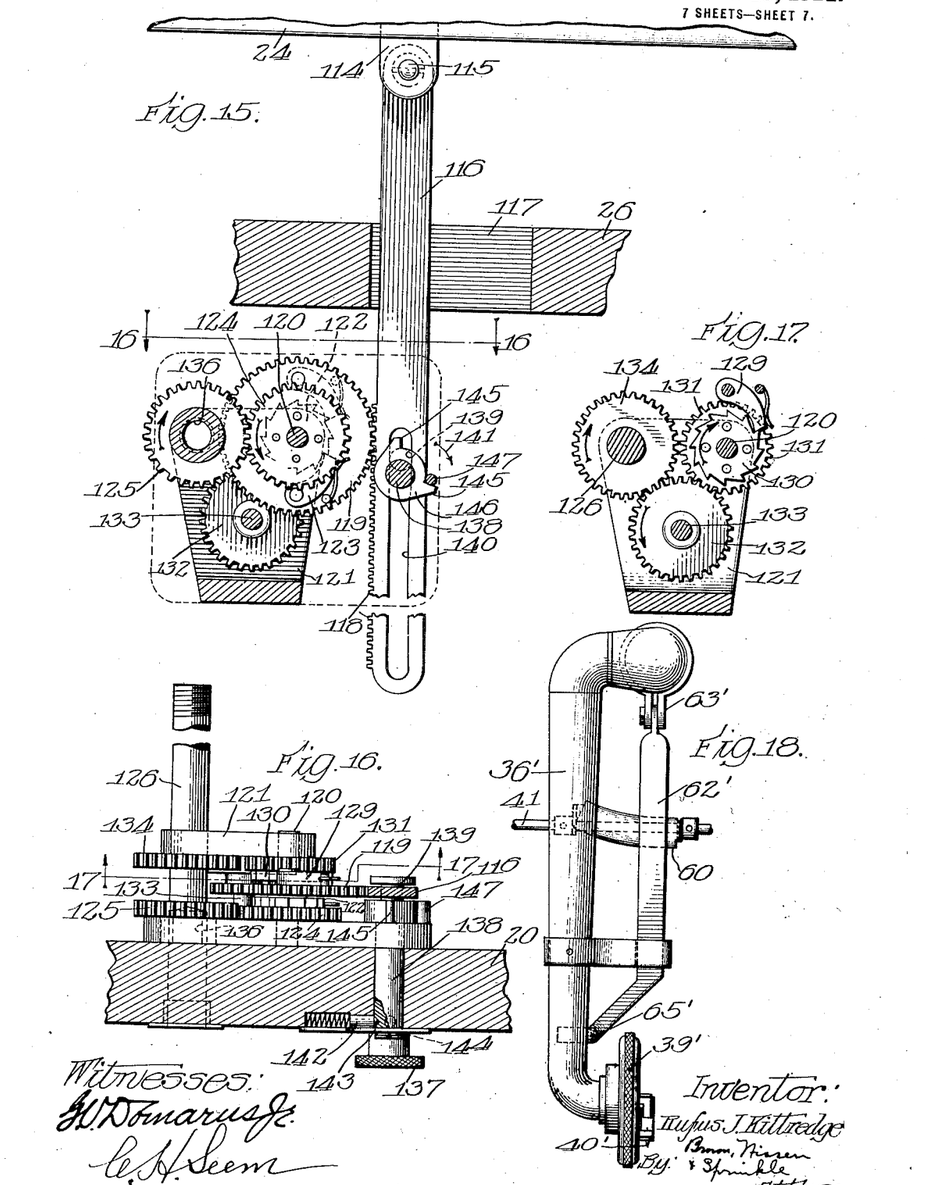
Fig. 15 is an enlarged section taken on line 15—15 in Fig. 2.
Fig. 16 is a section taken on line 16—16 of Fig. 15.
Fig. 17 is a section taken on line 17—17 in Fig. 16.
Fig. 18 is a top view of a modified form of tone arm from that shown in Figs. 1, 2 and 3, and illustrates the mechanism for raising such tone arm.

I find it desirable to provide a connection between the lid 24 and the motor 27 whereby oscillatory movement of the lid will cause the motor to be wound. This serves as a means for economizing time and also for producing easy means of winding the motor. Any suitable mechanism may be employed and I have shown one form of such mechanism. In the form shown, an ear 114 is secured to a portion of the lid 24 and pivoted as at 115 to a bar 116 which extends through an opening 117 in the partition 26 and downwardly into chamber 23. The lower end of said bar is provided with rack teeth 118 normally meshing with a gear 119, said gear being loosely mounted on shaft 120 journaled in a frame 121. The frame is secured to the inner wall of casing 20 in any suitable manner. On the shaft 120 is a ratchet wheel 122 coöperating with a pawl 123 carried by the gear 119. The ratchet wheel 122 is secured to a gear 124 which meshes with a gear 125 and the latter is secured to a shaft 126 which is provided with a threaded end threaded in the hub of a gear 127 which in turn meshes with a gear 128 of the motor 27. Carried on the other side of gear 119 is a pawl 129 which engages a ratchet wheel 130 secured to a gear 131, and the ratchet wheel 130 and gear 131 are both loosely mounted on shaft 120. The gear 131 meshes with an intermediate gear 132 journaled on a stud shaft 133. The gear 132 meshes with a gear 134 secured to shaft 126. The arrangement of the pawls 123 and 129 is such that upon downward movement of the lid 24, the rack teeth 118 move the gear 119 which moves the gears 124 and 125 in the directions indicated by the arrows in Fig. 15, to wind the motor. Upon upward movement of the lid 24, the rack teeth 118 move the gear 119 in the opposite direction to that just referred to, thereby causing pawl 129 to move ratchet wheel 130, gears 131, 132 and 134, in the directions indicated by arrows in Fig. 17, causing the shaft 126 to be rotated in the same direction in which it was operated by the downward movement of the lid through the first-mentioned set of gears and pawl and ratchet connections. Should it be desired to wind the motor by a manually operable crank, not shown, as is ordinarily done, such a crank is inserted in an opening 135, see Fig. 1, and threaded in the hub 135 of gear 125 (Fig. 15). This provides means for winding the motor in the usual manner. In winding the motor with a manually operable crank, the rack bar 116 is disconnected from the gear 119. This is accomplished by manually operating the hand wheel 137. The hand wheel 137 is secured to a shaft 138 carrying a crank pin 139 at its inner end. The crank pin is slidably mounted in a slot 140 in the bar 116 so that upon rotating the hand wheel 137 from its position shown in Figs. 15 and 16, through 90° in the direction of the arrow 141, (see Fig. 15,) the rack teeth 118 will be disengaged from the gear 119, permitting the lid 24 to be moved without moving the winding mechanism. As a means for locking the shaft 138 in the two positions indicated, I provide a spring pressed member 142 adapted to engage two recesses 143 and 144 in the shaft 138. This provides means for facilitating the holding of said shaft in either of the positions mentioned. To further facilitate holding the shaft 138 in such positions, I provide lugs 145 on a collar 146, secured on the shaft 138 in such positions that one of the lugs 145 will engage a pin 147 carried in the casing to positively stop the shaft 138.

In Fig. 18 I have shown a modified form of tone arm. In this form of construction the lever 62′ is pivoted to a clamp 63′ in a manner similar to that already described for the preferred form, and in such positions as to coöperate with the cam 60 in the same manner as already described. The end 65′ of the arm 62′ engages a suitable portion of the tone arm 36′ as indicated, so that upward movement of the arm 62' will cause upward movement of the small end of the tone arm 36', sound box 39', and needle 40'. From this it will be seen that upon varying the tone arm 36 all that is necessary to apply my invention to such modified tone arm, is to change the shape of the engaging parts in order to produce the necessary movements in such tone arms to disconnect the needles from the records.

Figure 1:
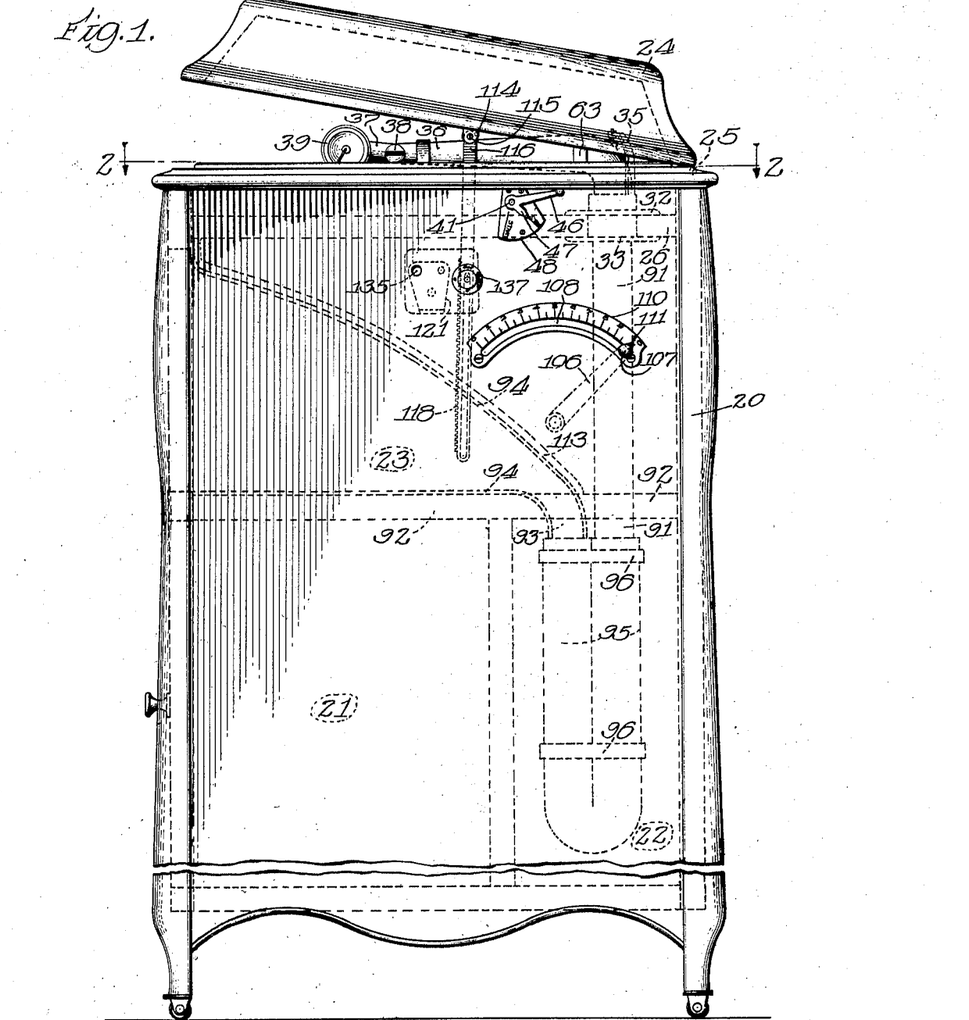
Figure 1 is a side elevation of a cabinet phonograph embodying my invention.

From the description set forth, it will be seen that to start the phonograph, it is necessary to raise the lid 24, in order to wind the machine and permit the placing of a record in position on the turn-table 29. The raising and lowering of lid 24 causes sufficient winding of the motor to play the record. The arm 46 is moved from its position shown in Fig. 1 until its pointer 47 registers with the notation "Start" on plate 48, which causes the disengagement of brake 51 from the turn-table 29 permitting the motor to start. This movement also moves arm 58 into engagement with the lock 55 to maintain the brake in position to permit the turn-table to revolve. This movement of arm 46 also moves the cam 60 from its engagement with arm 62, thereby permitting the needle to engage the record. The parts are so arranged that upon the tone arm 36 engaging the member 78, the end 57 of member 55 will be disengaged from arm 58 and the shaft 41 dropped by means of the spring 49, which in turn will move the cam 60 to lift the needle out of contact with the record. At the same time the arm 52 will be moved to permit the spring 53 to press the brake 51 against the periphery of the turn-table 29 to stop the latter. It will, therefore, be seen that since the cam 60 and the arms 52 and 58 are mounted to rock with the shaft 41, the needle will be disengaged from the record at a predetermined point on the record and further rotation of the record immediately discontinued. The spring 53 tends to move the lever 50 so as to engage the arm 52 and rock the shaft 41 to the position where the cam 60 will lift the needle off the record and in this respect the spring 53 assists the spring 49. When the tone arm 36 is moved to initial position in accordance with the indication on the label after the starting has been predetermined, the lever 46 is actuated to starting position, as shown in Fig. 1, whereupon the shaft 41 will be rocked into such position that the arm 58 on the rock shaft 41 will snap behind the latch 57, so that the brake 51 will be held released and the cam 60 be held in lower position until it is again automatically lifted by the automatic release of the latch 57.

While I have illustrated and described the preferred form of construction, I do not desire to be limited to the precise details set forth, but desire to avail myself of such variations and changes as come within the scope of the appended claims.

What I claim is:

1. A phonograph comprising a turntable; a brake; a spring tending to move the brake into engagement with the turntable; a tone arm pivoted for horizontal movement and having a portion pivoted for vertical movement; a shaft having a connection with said brake; a cam on said shaft; a spring connected with the shaft and adapted to rotate the latter and move the cam into engagement with the tone arm to raise the vertically movable portion of the latter; a catch engaging the shaft and holding the latter against the influence of the last-mentioned spring; a manually operable crank on the shaft for rotating the latter to wind up said spring, to engage the shaft with said catch and to move the cam out of operative engagement with the vertically movable portion of the tone arm; a stop in the path of the tone arm adapted for movement by the latter; and a connection between the stop and catch for disconnecting the latter from the shaft upon movement of the tone arm against said stop to free the shaft and brake for actions thereupon by said springs.

2. A phonograph comprising a turntable; a tone arm; a sound box carried by the tone arm; a spring-pressed brake normally engaging the turntable; a shaft rotatable manually in one direction; a spring connected with the shaft for rotating the latter in the opposite direction; a catch for locking the shaft against the influence of said spring; and a cam on the shaft for moving the sound box away from the turntable, movement of the tone arm being adapted to disengage the catch from the shaft to free the latter for movement by said spring.

3. In a phonograph, the combination of a record carrier; a spring-pressed brake normally engaging the record carrier; a shaft connected with said brake and adapted for manual movement in one direction; a catch; an arm on said shaft adapted to engage said catch; a spring tending to return the shaft to normal position; an arm on said catch; a trip member in the path of the tone arm connected with the arm on said catch and adapted upon being engaged by the tone arm to disengage the catch from the arm on said shaft to permit the spring to rotate the shaft to normal position; and means for setting said trip member to be engaged at different points in the path of the tone arm.

4. In a phonograph, the combination of a turntable; a tone arm; a sound box carried by said arm; a spring pressed brake normally engaging the turntable; a manually operable shaft connected with the brake; and a cam on the shaft adapted to engage the tone arm and hold the sound box away from the turn-table, movement of the shaft in one direction being adapted to disengage the brake from the turn-table and move the cam to lower the sound box.

5. In a phonograph, the combination of a record-carrier; a spring pressed brake normally engaging the same; a manually operable shaft connected with the brake; a lock; an arm on the shaft adapted to engage the lock upon movement of the shaft from its normal position and to hold the brake out of engagement with said carrier; a spring tending to return the shaft to normal position; an oscillatory tone arm; and a trip member in the path of the tone arm, connected with the lock and adapted to unlock the lock from said shaft upon engagement with the tone arm and cause the spring to return the shaft to normal position.

6. In a phonograph, the combination of a record-carrier; a spring pressed brake normally engaging the same; a manually operable shaft connected with the brake; a lock; an arm on the shaft adapted to engage the lock upon movement of the shaft from its normal position and to hold the brake out of engagement with the said carrier; a spring tending to return the shaft to normal position; an oscillatory tone arm; a cam on the shaft; and a trip member in the path of the tone arm, connected with the lock and adapted to unlock the lock upon engagement with the tone arm and cause the spring to return the shaft to normal position, thereby applying the brake to the said carrier and raising a portion of the tone arm by the cam.

7. A phonograph comprising a record carrier; a tone arm having a portion mounted for vertical movements; a shaft adjacent the tone arm; a cam and an arm fixed on said shaft; a spring connected with the shaft adapted to rotate the latter and said cam for moving the movable part of the tone arm away from the record carrier; a catch; and manually operable means connected with the shaft for rotating the latter against the influence of said spring and engaging the arm on said shaft with said catch.

8. In a phonograph, the combination of a record carrier; a tone arm having a portion mounted for movement toward and away from said carrier; a pivoted arm having one end engaging the movable part of the tone arm; a shaft manually operable in one direction; a cam on the shaft adapted to engage the pivoted arm to raise and lower the movable part of the tone arm; and a spring on the shaft adapted to rotate the latter to normal position and raise the movable part of the tone arm.

9. In a phonograph, the combination of a record-carrier; a tone arm having a part mounted for movement toward and away from the said carrier; a pivoted arm having one end engaging the movable part of the tone arm; a cam; a manually operable means adapted to move the cam out of engagement with the pivoted arm and lower the movable part of the tone arm; and a spring adapted to engage the cam with said pivoted arm to raise the movable part of the tone arm.

10. In a phonograph, the combination of a record-carrier; a tone arm having a part mounted for movement toward and away from said carrier; a pivoted arm having one end engaging the movable part of the tone arm; a rock shaft; a cam fixed on the rock shaft; manually operable means on the rock shaft adapted to rotate the latter and move the cam out of engagement with the pivoted arm; and a spring on the rock shaft adapted to rotate the latter and engage the cam with said pivoted arm.

11. In a phonograph, the combination of a record-carrier; a tone arm having a part adapted to swing vertically; a pivoted arm engaging the vertically swinging part of the tone arm; a rock shaft; a cam on the rock shaft; a spring on the rock shaft adapted to rotate the latter and engage said cam with said pivoted arm to raise the vertically swinging part of the tone arm; a crank arm on the rock shaft adapted to rotate the latter and move the cam out of engagement with said pivoted arm; and a lock adapted to engage the rock shaft when in its last-named position and maintain the cam out of engagement with the pivoted arm.

12. In a phonograph, the combination of a record carrier; a support adjacent the same; an annular member encircling and rotarily mounted on said support; an oscillatory tone arm pivoted in the support; a finger carried by the tone arm; and a pointer on the annular member in the path of said finger.

13. In a phonograph, the combination of a record carrier; a support adjacent thereto; an oscillatory tone arm pivoted to the support; a finger carried by the tone arm; a member rotatably mounted on said support; a pointer on said member adapted to move in a plane substantially parallel with the path of the travel of said finger; and manually operable means connected with said member for adjusting the latter.

14. A phonograph comprising a turntable; a tone arm adapted to swing over the turntable; a lever carrying a brake adjacent the turntable; a spring connected with the lever and tending to move the brake into engagement with the turntable; a catch connected with the lever and adapted to hold the brake out of engagement with the turntable; a stop in the path of the tone arm, said stop being adapted for limited movement by the tone arm; a member connected with said stop and engaging the catch, said member being adapted to be moved by the stop and in turn to disengage the catch from the lever permitting said spring to move the brake into engagement with the turntable.

15. A phonograph comprising a turntable; a tone arm adapted to swing over the turntable; a lever carrying a brake adjacent the turntable; a spring connected with the lever and tending to move the brake into engagement with the turntable; a shaft having two arms thereon, one of the arms engaging said lever; a catch engaging the other of said arms holding the brake out of engagement with the turntable; a stop in the path of the tone arm and movable to a limited degree by the latter; a longitudinally slidable member engaging said catch; and a connection between the stop and said longitudinally slidable member, said tone arm being adapted to operate through said connection and longitudinally slidable member to disengage the catch from the arm of said shaft to free the brake.

In testimony whereof I have signed my name to this specification, in the presence of two subscribing witnesses, on this 6th day of May, A. D. 1915.

RUFUS J. KITTREDGE.

Witnesses:
CHAS. M. NISSEN,
CHARLES H. SEEM.